Nov. 10, 1970 G. C. CALDERWOOD ET AL 3,539,439
POLYOLEFIN LAMINATES
Filed Sept. 21, 1964
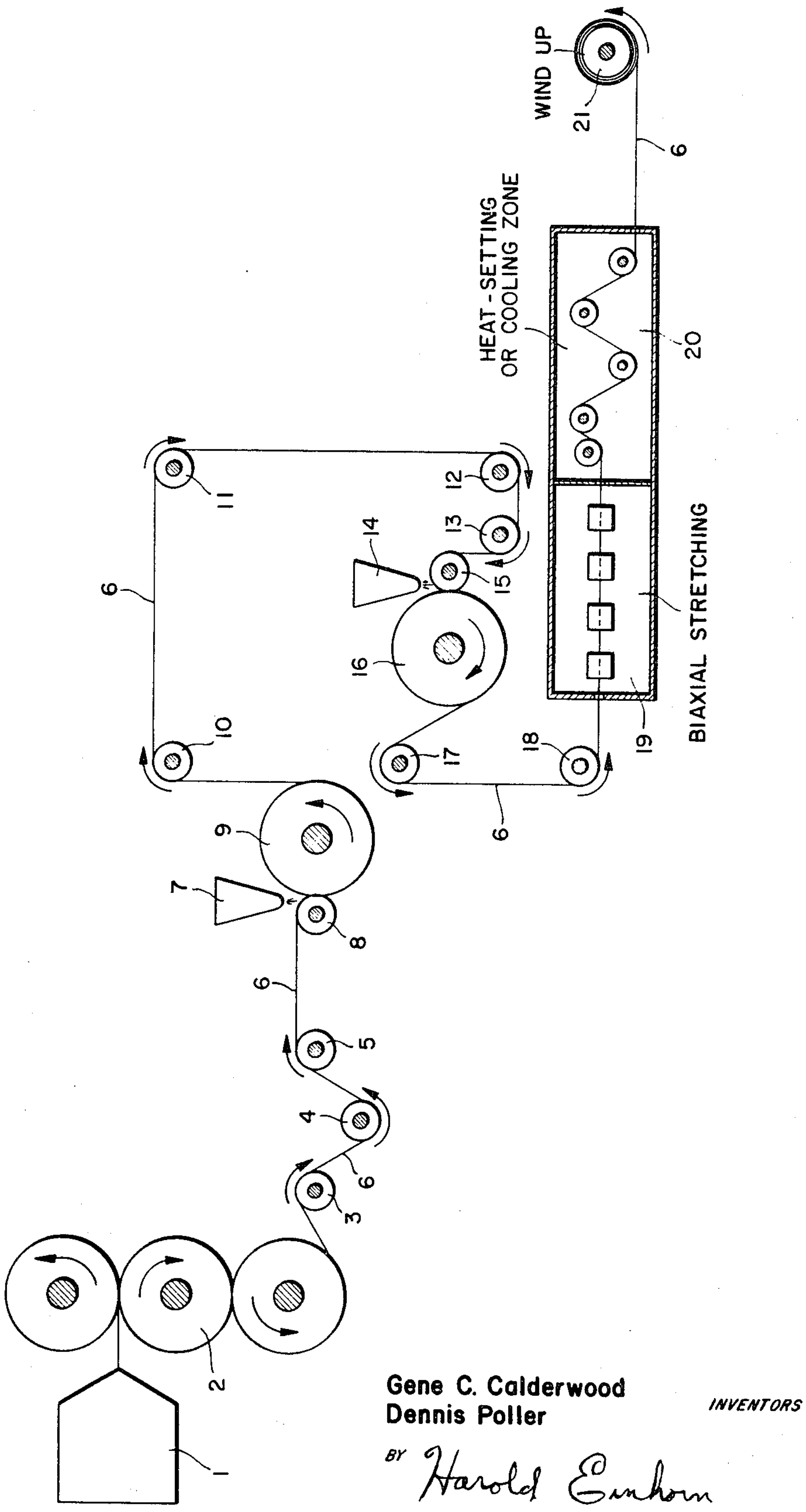
Gene C. Calderwood
Dennis Poller
INVENTORS
BY Harold Einhorn
PATENT ATTORNEY

3,539,439
POLYOLEFIN LAMINATES

Gene C. Calderwood, Green Village, and Dennis Poller, Highland Park, N.J., assignors to Esso Research and Engineering Company, a corporation of Delaware Filed Sept. 21, 1964, Ser. No. 397,823
Int. Cl. B32b 27/30; B29d 7/24
U.S. Cl. 161—165 3 Claims

ABSTRACT OF THE DISCLOSURE

Laminates made of a polyolefin base with different copolymer coatings thereon forms a highly efficient heat sealing and wrapping material, by extruding such coating material onto said polyolefin sheet stock followed by a biaxial orientation resulting in a thin coated film suitable for various packaging applications.

The present invention relates to the formation of heat-sealable propylene-based films. More particularly, the invention concerns a process for the formation of heat-sealable laminates of a propylene-based film coated with a polymer formed from a free-radical polymerizable monomer.

Predominantly crystalline polypropylene generally having an isotactic content of at least about 85%, a density of at least 0.89 gram per cubic centimeter and a melting point of about 165–170° C., as well as ethylene-propylene copolymers, are synthetic polymers that are finding wide acceptance in the plastic art. One of the most promising uses for these polymers is in the manufacture of oriented films for flexible packaging applications. However, oriented films manufactured from predominately crystalline polypropylene and copolymers of ethylene and propylene have not secured wide commercial acceptance in packaging applications since the materials are not readily heat-sealable and are more permeable to gases than desired for many applications.

Various methods have been employed to make propylene-based polymeric films heat-sealable as well as to improve the gas and moisture barrier characteristics of the polymer. Coating of the propylene-based polymer with polymers of free-radical polymerizable monomers has been a commonly attempted method for upgrading propylene-based polymers to make the same readily amenable to packaging applications. However, coating procedures have been subject to numerous processing difficulties. For example, the polymeric coat does not readily adhere to propylene-based polymeric substrates, and as a result various methods have evolved to render the substrate receptive to coatings (see British Pat. 920,078). Similarly, the extrusion of coatings onto oriented substrates is often ineffective, as a film of oriented polypropylene may lose its orientation when it is contacted with a hot molten polymer, unless conditions are carefully controlled. Most importantly, thin layers of polymeric coating (less than 0.1 mil in thickness) are extremely difficult to obtain utilizing conventional extrusion coating techniques onto oriented films.

Now, in accordance with this invention, polypropylene or ethylene-propylene copolymers can be processed to form heat-sealable films. The heat-sealable films are formed by extruding or casting predominately crystalline polypropylene or a copolymer of ethylene and propylene into sheet stock of suitable thickness. The cast polymer is then extrusion coated with a polymer of a free-radical polymerizable monomer, the polymer having a lower softening temperature than the polypropylene or ethylenepropylene copolymer substrate. The polymeric substrate may be coated on one or both sides. The coated substrate is then biaxially oriented by stretching the sheet stock laterally and longitudinally about 4 to 8 times its normal width and length. As a result the coated substrate increases in area by about 16 to 64 times its unstretched area, and simultaneously the thickness of both the coating and the sheet stock are reduced.

The stretching of the sheet stock may be accomplished in two stages, laterally and longitudinally, in either order, or simultaneously. The biaxial orientation of the coated sheet stock causes the formation of relatively fresh surfaces of both the substrate and the coating material. As a result of the coating and the substrate being in intimate contact with each other, they strongly adhere to each other without the necessity of preconditioning the substrate to accept a polymeric coating. Following the completion of the stretching operation, the film may or may not be heat set, as desired, by heating the film while controlling or preventing changes in its dimensions, and then allowing it to be cooled.

Utilizing the process of the present invention, heat-sealable propylene-based films having uniformly thin coatings, from 0.02 to 0.15 mil, are readily secured. When conventional film coating techniques previously employed for the coating of propylene-based films are employed wherein the coating resin is extruded directly onto oriented film, the uniformly thin coated films of the present invention are not obtainable as it is extremely difficult to directly extrude layers of material having thicknesses less than two-tenths of a mil.

The invention will be more readily understod by reference to the following detailed description taken in connection with the accompanying drawing which is a schematic representation of the coated film forming process.

Referring now to the figure, predominately crystalline polypropylene or a copolymer of ethylene and propylene is heated to a molten condition and is extruded by extruder 1 through a long, narrow slot or orifice having a die gap, for example, of 0.06 inch into a casting stack 2, maintained at a temperature of about 40° to 200° F., depending upon the thickness of the sheet cast and the speed of casting. The polypropylene or ethylene-propylene copolymer is extruded at a temperature ranging from about 475° to 550° F. The thermoplastic resin substrate material solidifies on the casting rolls, and the solidified sheet is taken off over rollers 3, 4 and 5 and is led to the first coating extruder assembly.

The coating assembly is made up of extruder 7, pressure roll 8, and chill roll 9. Substrate sheet 6 first passes over pressure roll 8. The pressure roll is a large metal idler roll with a covering of neoprene or silicone rubber. The coating composition which is made up of a polymer or a mixture of polymers formed from free-radical polymerizable monomers is heated in extruder 7 and passes through the extruder die opening. The die opening is generally around 12 to 30 mils. Upon leaving the die, the thin melt film is drawn down into the nip between the driven chill roll 9 and the pressure roll 8. Here, while coming into contact with the faster moving substrate sheet 6 just before it reaches the nip, the hot film is drawn out to the desired thickness and pressed onto the substrate by the pressure roll 8, using a force of 50 to 100 lbs. per linear inch. The film is cooled simultaneously by the chill roll 9.

The chill roll is usually a chrome-plated twin-shell steel drum cored for chill water throughout to provide temperature control and heat transfer for the molten web during its transition from melt to solid state and for subsequent cooling. Chill roll temperature is usually maintained between about 50° and 100° F.

The propylene-based resin substrate that is coated on one side is then passed to a second coating zone wherein the other side of the substrate is coated with the same or a different resin from that used in the first coating operation. Rollers 10, 11, 12 and 13 direct the coated substrate to the second coating zone. The second coating zone is again made up of extruder 14, pressure roll 15 and chill roll 16. The coating process proceeds in a manner similar to that enunciated for the first coating operation. The substrate that is now coated on both sides is then directed to the biaxial stretching zone by means of rollers 17 and 18.

From roll 18, coated sheet 6 passes to biaxial stretching zone 19. In the stretching zone, the film is first preheated to a temperature of about 300° F. and may then be stretched by a two-stage process, i.e., "along" and then "across" or vice versa, or as a simultaneous "along" and "across" stretch. The stretching process is carried out at a temperature of about 250° to 325° F. and the coated substrate is stretched from about 4 to 5 times, preferably 5 to 7 times, in unit length and width to obtain films suitable as flexible packaging materials. After final stretching, the substrate material varies from about 0.5 to 1.50 mils in thickness, depending upon original thickness and subsequent stretch ratios, and the coating is generally less than 0.2 mil in thickness, again depending upon original coating thickness and stretch ratio. The biaxial stretching operation can be performed with a variety of machinery whose function and operation is well known to the art.

Following the completion of the stretching operation, the coated film may be heat-set in zone 20 at a temperature of about 250° F. to 300° F. while under tension or under conditions such that no substantial shrinkage occurs. The biaxially oriented coated polypropylene-based film is then cooled or permitted to cool to a temperature of less than about 100° F. and then passed to windup 21.

The process of this invention is useful for coating films of predominately crystalline polypropylene and films of ethylene-propylene copolymers with an organo thermoplastic polymer formed from a free-radical polymerizable monomer. The coating polymer must be a normally solid material that will become fluid and extrudable at a temperature not too far above and preferably below the melting point of the substrate polymer. Additionally, the coating polymer must have a lower softening temperature than the substrate polymer if the resulting film is to be used as a heat-sealable packaging material.

Representative, non-limiting examples of suitable coating polymers that meet the requirements of the invention are polyethylene (high and low density), polyvinylidene chloride, polyvinyl chloride, polyvinyl acetate, copolymers of vinylidene chloride with vinyl chloride, copolymers of vinyl chloride with vinyl acetate, ethylene-vinyl acetate copolymers, polymethyl methacrylate, polystyrene, and mixtures of the above polymers.

The above-identified polymers are formed utilizing methods well known in the art. For example, vinylidene chloride-vinyl chloride copolymers can be prepared employing the techniques specified by Reinhardt, Ind. & Eng. Chem., 35, 422–428 (1942). Similarly, various monomers such as styrene, methyl methacrylate, vinyl chloride, ethylene, propylene, and vinyl acetate can be polymerized, and copolymerized according to methods enunciated in Canadian Pat. 680,084, German Pat. 1,169,667, and U.S. Pat. 3,130,185.

Preferred coating polymers in the process of the present invention are copolymers of vinylidene chloride with vinyl chloride or vinyl chloride with vinyl acetate. Copolymers containing between about 60 wt. percent and 90 wt. percent of vinylidene chloride are extrudable at relatively low temperatures. The preferred vinylidene chloride based coating polymers are extruded at temperatures in the range of from about 250° to 400° F., preferably 275° to 350° F.

Additionally, higher melting rapidly crystallizing vinylidene chloride based resins can be admixed with lower melting resins to secure final compositions that exhibit excellent non-blocking properties. It has been found that a mixture containing about 50 to 95 wt. percent of a low melting (140° to 145° C.) drawable vinylidene chloride-vinyl chloride copolymer containing from 65 to 85 wt. percent vinylidene chloride and 50 to 5 wt. percent of a higher melting (150° to 167° C.) rapidly crystallizing vinylidene chloride-vinyl chloride copolymer containing from about 80 to 90 wt. percent vinylidene chloride exhibit an excellent combination of good drawability, heat-sealability, low gas permeability and desirable optical clarity. Similarly, a mixture of polymers consisting of from about 99 to 65 wt. percent of a copolymer of vinylidene chloride and vinyl chloride and 1 to 35 wt. percent of low molecular weight poly(methyl methacrylate) is a highly effective film coating composition.

The compositions may be prepared by milling the components on a two-roll mill at temperatures in excess of 325° F. or by extrusion at suitable temperatures. Coatings consisting of 100% of a low melting vinylidene chloride-vinyl chloride copolymer give rolls which can be unwound only with some difficulty because of blocking. Coatings consisting of 100% of a higher melting copolymer can be drawn down to the desired thicknesses only with a great degree of difficulty.

The processability of various coating polymers can be greatly enhanced by incorporating minor amounts of plasticizers into the polymers prior to extrusion. Representative examples of useful plasticizers include dibutyl sebacate, diethyl phthalate, ethyl phthalyl ethyl glycolate, diisobutyl adipate, etc.

This invention and its advantages will be better understood by reference to the following examples:

EXAMPLE 1

A copolymer of vinylidene chloride and vinyl chloride was selected having a final melting point of 145° C., and having a relative viscosity of 1.10 as measured in orthodichlorobenzene at 250° F., at a polymer concentration of 3 grams per liter. The polymer contained approximately 70 wt. percent chlorine and was further described by differential thermal analysis, by which it was found that a major transition existed in the vicinity of 140° C.

This polymer was fed to a 2½" Hartig extruder having an 11/1 L/D ratio. The extruder was equipped with a 22" width Hartig "coathanger" die having a 15 mil gap width and a 1-inch land length. The cylinder, adapter, and die were separately steam heated and maintained at about 315° F. At an output of 50 lbs./hr., the melt temperature was measured and found to be 315° F.

A web of the above polymer was then extrusion-coated onto 20 mil polypropylene sheet prepared by a chill roll process. The melt flow rate of the polypropylene at 230° C. was in the vicinity of 8 to 10. The extrusion coating operation was conducted using an Egan lamination machine in which the extruded web was laminated onto the polypropylene sheet between an 8-inch diameter silicone rubber roll and an 18-inch nickel-plated chill roll. The coating deposited on the polypropylene sheet varied from 1 to 2 mils. The draw-down distance between the die lips and the nip was about 4 inches. When one side of the roll of polypropylene sheet was coated, the roll was again fed through the machine and the other side coated.

The coated sheet prepared by the process enunicated above was then biaxially oriented with a T.M. Long laboratory orientation unit to a 25 to 49-fold reduction in thickness and with a corresponding increase in area. Typical orientation temperatures were in the vicinity of 300° F. Following the biaxial orientation procedures, the final film produced consisted of a substrate having a thickness of about 0.5 to 0.8 mils and a coating having a thickness varying from 0.03 to 0.06 mils per film side. The films produced were well balanced and had excellent optical properties. The heat-seal strengths of the films produced were between 100 and 250 grams per inch of seal compared with negligible seal strengths for the uncoated polypropylene material. The oxygen permeability of typical two-side coated films ranged from 1.5 to 7 standard cc. $O_2$/100 inches)$^2$ (24 hours) (atmosphere).

EXAMPLE 2

To illustrate the applicability of utilizing various polymer blends made from free radical polymerizable monomers, 60 wt. percent of the vinylidene chloride-vinyl chloride copolymer described in conjunction with Example 1 was mixed with 40 wt. percent of a higher melting copolymer of vinylidene chloride and vinyl chloride. The second vinylidene chloride-vinyl chloride copolymer exhibited a transistion melting point of 150° C. and a final melting point of 167° C. and had a relative viscosity as measured in orthodichlorobenzene at 250° F. at a polymer concentration of 3 grams per liter of 1.07 and contained about 72 wt. percent chlorine.

The mixture was prepared by tumbling the respective powders together for 1 hour using a drum tumbler. The resulting mixture was then extruded onto a polypropylene substrate and biaxially oriented in accordance with the procedure of Example 1. The resulting coated oriented films prepared with this composition had optical properties equal to or better than those previously described. The film showed a rapid loss of tack and little or no tendency to block after orientation. Heat-seal strengths of seals formed from the coated film varied from 100 to 250 gms./inch of seal.

EXAMPLE 3

A copolymer consisting of 87 wt. percent of vinyl chloride and 13 wt. percent vinyl acetate having a relative viscosity of 1.4 in a 1% cyclohexanone solution at 25° C. was mixed on a 2-roll mill at 300° F. for 5 minutes. The resulting fused material was then pressed onto small squares of 20 mil polypropylene sheet stock using an electrically heated press at 330° C. The coated substrate was then cooled between water-cooled platens. The coated sheet prepared by this method was then biaxially oriented at approximately 310° F. using a T.M. Long laboratory orientation unit. It was found that this coating material was readily drawn down to the desired coating thickness and that the film obtained had good optical properties and exhibited no short-or long-term blocking. Seal strengths of seals formed with films made according to this example varied from 50 to 200 gms./inch of seal.

EXAMPLE 4

Using the equipment and film-forming procedure of Example 1, the vinylidene chloride-vinyl chloride copolymer of Example 1 is extrusion coated onto 20 mil sheets of ethylene-propylene copolymer prepared by a chill roll process. The coated sheet prepared by the above process is then biaxially oriented under conditions similar to those set forth in Example 1 to give a well-balanced, coated film exhibiting good seal strengths and permeability characteristics.

EXAMPLE 5

A low density polyethylene having a density of 0.923 and a melt index of 2.0 is fed to a 2½ inch Egan extruder having a 20/1 L/D ratio and a 4-turn metering section on the screw. The extruder is equipped with a 22-inch width Prodex "coathanger" die having a 15 mil gap width and a one-inch land length. The system is electrically heated. At an output of 50 lbs./hr., the melt temperature is approximately 400° F.

The above polymer is then extrusion coated onto both sides of a 10-mil sheet of polypropylene formed according to the procedure of Example 1. Orientation of the sheet and other operations are conducted in the usual manner. The polyethylene coated biaxially oriented film prepared by this method exhibits excellent clarity and sealability and very low permeability to water vapor. Heat-seal strengths ranging from 250–350 grams/inch of seal are obtained after heat sealing the coated film at 250° F.

EXAMPLE 6

Polypropylene sheet stock of 20 mil thickness was prepared according to the procedure of Example 1. A composition consisting of 90 wt. percent of the vinylidene chloride-vinyl chloride copolymer of Example 1 was admixed with 10 percent by weight of a low molecular weight polymer of methyl methacrylate having an inherent viscosity of 0.20 dl./g. as measured in chloroform at 20° C. The mixture of coating polymers was then milled at 300° F. and pressed onto the polypropylene sheet stock according to the method set forth in Example 3. The coated sheet stock was then biaxialy oriented using a T. M. Long orientation unit to the extent of increasing both the lateral and longitudinal dimensions of the sheet to 5 times its original length and width. The resulting film exhibited excellent slip and optical characteristics and had a heat-seal strength in excess of 300 grams per inch of seal when heat-sealed at 250° F.

Further advantages of this invention will be apparent to those skilled in the art. Coated propylene-based films that ares readily heat-sealable can be directly prepared by the process of the present invention. It is to be understood that this invention is not limited to the specific examples set forth herein that have been offered merely as illustrations and that modifications may be made without departing from the spirit and scope of the appended claims.

What is claimed is:

1. A heat-sealable laminate comprising a polypropylene film having a thickness varying from 0.5 to 1.50 mils coated on at least one side with a polymer mixture comprising 99 to 65 wt. percent of a copolymer of vinylidene chloride and vinyl chloride having a melting point in the range of from about 140° to 145° C. wherein the vinylidene chloride content is between 60 and 90 wt. percent and 1 to 35 wt. percent of low molecular weight methyl methacrylate polymer, said coating being from about 0.02 to 0.15 mil in thickness.

2. A method for obtaining uniformly thin coated polymer films which comprises casting into the form of a sheet at a temperature of 400° to 550° F., a molten propylene-based resin selected from the group consisting of polypropylene and ethylene-propylene copolymers; extruding onto at least one surface of a web of said propylene-based resin at a temperature of from about 250° to 400° F., a mixture containing (a) 99% to 65% of a vinylidene chloride-vinyl chloride molten copolymer coating wherein the vinylidene chloride content is between 60 and 90 wt. percent and (b) 1% to 35% of a low molecular weight polymethyl methacrylate polymer; biaxially orienting the coated sheet by laterally and longitudinally stretching the same at a temperature of 250° F. to 325° F.; and recovering a laminate comprising an oriented propylene-based film having said continuously adherent polymer coating therein.

3. A method for obtaining uniformly thin coated polymer films which comprises casting into the form of a sheet at a temperature of 400° to 550° F., a molten propylene-based resin selected from the group consisting of polypropylene and ethylene-propylene copolymers; extruding onto at least one surface of a web of said propylene-based resin at a temperature of from about 250° to 400° F., a vinylidene chloride-vinyl chloride molten copolymer coating wherein the vinylidene chloride content is between 60 and 90 wt. percent, said coating polymer being a mixture comprising 50 to 95 wt. percent of a copolymer of vinylidene chloride and vinyl chloride having a melting point in the range of about 139° to 145° C. and 50 to 5 wt. percent of a vinylidene chloride-vinyl chloride copolymer having a melting point in the range of about 160° to 167° C.; biaxially orienting the coated sheet by laterally and longitudinally stretching the same at a temperature of 250° F. to 325° F.; and recovering a laminate comprising an oriented propylene-based film having said continuously adherent polymer coating thereon.

References Cited

UNITED STATES PATENTS

| | | | |
|---|---|---|---|
| 3,223,761 | 12/1965 | Raley | 264—95 |
| 3,294,621 | 12/1966 | Baird et al. | 161—252 |
| 2,235,782 | 3/1941 | Wiley | 260—87.7 |
| 3,236,675 | 2/1966 | Hermitte et al. | |
| 3,240,742 | 3/1966 | Hahn et al. | 260—899 |
| 3,287,446 | 11/1966 | Koch | 260—899 |
| 2,627,088 | 2/1953 | Alles et al. | 117—34 |
| 3,084,065 | 4/1963 | Bach | 260—899 |
| 3,286,009 | 11/1966 | Yumoto et al. | 117—7 |
| 3,322,614 | 5/1967 | Seiferth et al. | 156—264 |

ROBERT F. BURNETT, Primary Examiner

R. J. ROCHE, Assistant Examiner

U.S. Cl. X.R.

117—7, 138.8, 161; 156—229, 244; 161—254, 402; 260—899, 901